(12) United States Patent
Yang et al.

(10) Patent No.: US 11,551,059 B1
(45) Date of Patent: Jan. 10, 2023

(54) MODULATED IMAGE SEGMENTATION

(71) Applicant: Snap Inc., Santa Monica, CA (US)

(72) Inventors: Linjie Yang, Los Angeles, CA (US);
Jianchao Yang, Los Angeles, CA (US);
Xuehan Xiong, Los Angeles, CA (US);
Yanran Wang, Evanston, IL (US)

(73) Assignee: Snap Inc., Santa Monica, CA (US)

(*) Notice: Subject to any disclaimer, the term of this patent is extended or adjusted under 35 U.S.C. 154(b) by 1028 days.

(21) Appl. No.: 16/192,457

(22) Filed: Nov. 15, 2018

Related U.S. Application Data

(60) Provisional application No. 62/586,637, filed on Nov. 15, 2017.

(51) Int. Cl.
| | |
|---|---|
| *G06T 7/00* | (2017.01) |
| *G06N 3/04* | (2006.01) |
| *G06N 3/08* | (2006.01) |
| *G06T 7/10* | (2017.01) |
| *G06F 17/18* | (2006.01) |
| *H04L 51/52* | (2022.01) |

(52) U.S. Cl.
CPC ............ *G06N 3/0454* (2013.01); *G06F 17/18* (2013.01); *G06N 3/08* (2013.01); *G06T 7/10* (2017.01); *H04L 51/52* (2022.05)

(58) Field of Classification Search
CPC ........ G06N 3/0454; G06N 3/08; G06F 17/18; G06T 7/10; H04L 51/52
USPC .......................................................... 706/15
See application file for complete search history.

(56) References Cited

U.S. PATENT DOCUMENTS

| | | | | |
|---|---|---|---|---|
| 10,089,743 | B1* | 10/2018 | Kim | G06N 3/0454 |
| 2011/0293187 | A1* | 12/2011 | Sarkar | G06V 10/757 |
| | | | | 382/190 |
| 2017/0213112 | A1* | 7/2017 | Sachs | G06T 7/11 |
| 2018/0276525 | A1* | 9/2018 | Jiang | G06F 40/216 |
| 2018/0341810 | A1* | 11/2018 | Prest | G06V 10/757 |
| 2019/0130229 | A1* | 5/2019 | Lu | G06V 10/462 |
| 2019/0236394 | A1* | 8/2019 | Price | G06V 10/26 |
| 2020/0320748 | A1* | 10/2020 | Levinshtein | G06T 1/20 |

* cited by examiner

*Primary Examiner* — Van D Huynh
(74) *Attorney, Agent, or Firm* — Schwegman Lundberg & Woessner, P.A.

(57) ABSTRACT

A modulated segmentation system can use a modulator network to emphasize spatial prior data of an object to track the object across multiple images. The modulated segmentation system can use a segmentation network that receives spatial prior data as intermediate data that improves segmentation accuracy. The segmentation network can further receive visual guide information from a visual guide network to increase tracking accuracy via segmentation.

20 Claims, 14 Drawing Sheets

MODULATED IMAGE SEGMENTATION

This application benefit of priority of U.S. Provisional Application Ser. No. 62/586,637, filed on Nov. 15, 2017, which is hereby incorporated by reference herein in its entirety.

TECHNICAL FIELD

The present disclosure generally relates to machines special-purpose machines that manage machine learning and improvements to such variants, and to the technologies by which such special-purpose machines become improved compared to other special-purpose machines for image segmentation using a neural networks.

BACKGROUND

Image segmentation is a computational task in which pixels corresponding to different areas of an image are labeled or assigned to categories. For example, pixels of an image of a girl holding a beverage may be labeled into different segments including: a "girl" area for pixels that depict the girl, and "beverage" area for pixels that depict the beverage. A neural network (e.g., a convolutional neural network) can perform image segmentation on some computer systems. However, neural network based image segmentation requires large models that often exceed the memory of smaller computer systems such as mobile phones. Further, implementing the models can exceed the available computational resources of the mobile phones (e.g., processor power or available memory).

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

Figure 1:
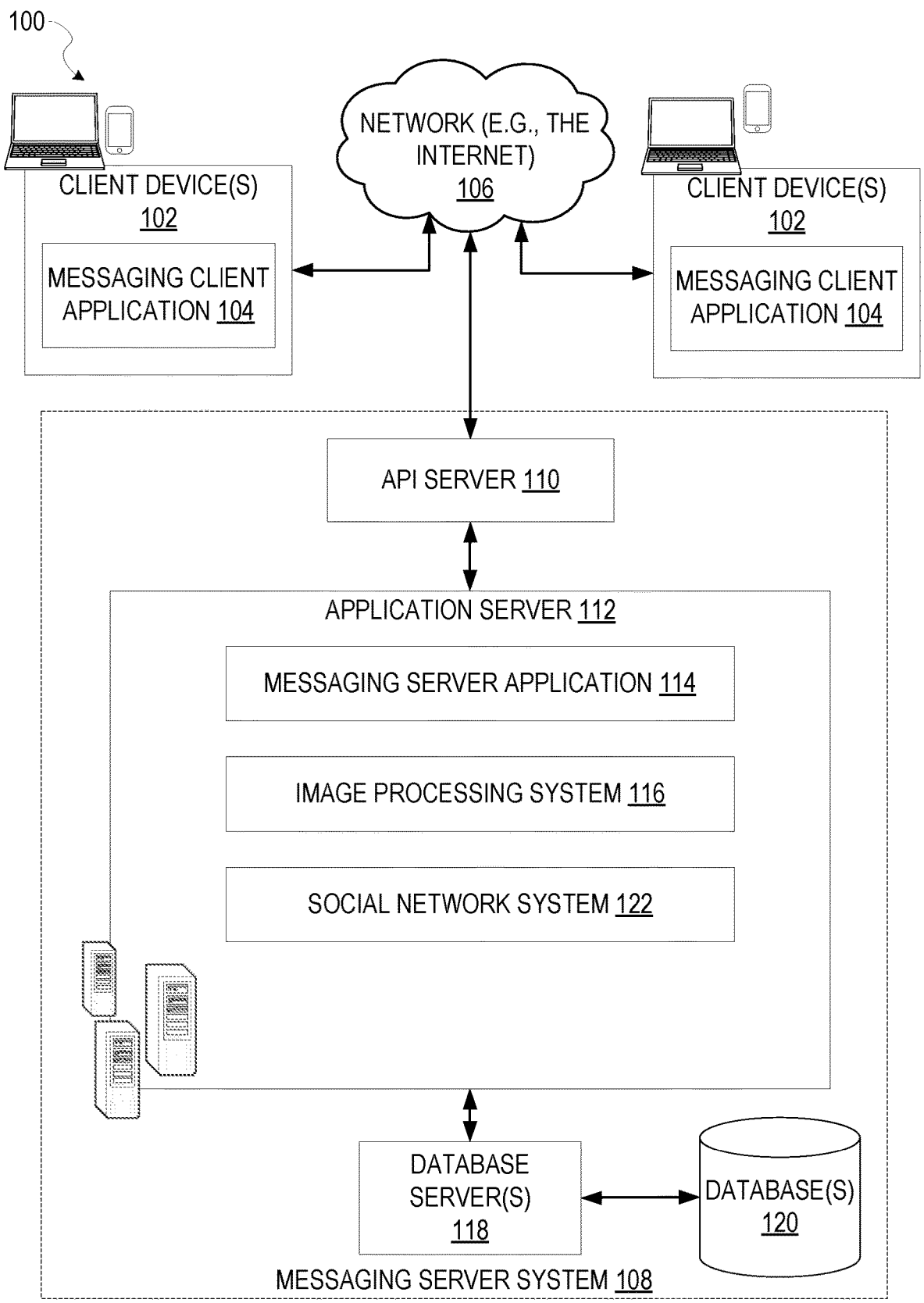
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Generally, image segmentation labels image pixels of an image into defined classes, thereby translating the image into an object map. Neural network (NN) based semi-supervised image segmentation can be performed on every frame of a video thereby allowing an object to be tracked across a number of frames as a segment or image mask. For example, in some embodiments, an object to be tracked in a video sequence is labeled only in the first frame of the video sequence (e.g., the object in the first frame is annotated using an object mask) and a neural network (e.g., convolutional neural network) is tasked to identify the object in the following frames of the video sequence. In some embodiments, a convolutional neural network is first trained to correctly segment an object in a first frame, then the convolutional neural network is trained for several hundred forward iterations and backward iterations to adapt the convolutional neural network model to correctly segment the object across the entire video sequence. Performing NN-based semi-supervised image segmentation approach can be slow on low-computational power devices, e.g., mobile phones. In some example embodiments, a modulator neural network (e.g., spatial guide modulator) is configured to generated distributions (e.g., layer parameters) that adjust the intermediate feature maps (e.g., intermediate feature data) of a segmentation network for a given arbitrary network to be segmented across a video sequence. In some example embodiments, the modulator neural network receives an image of an object and the object's spatial prior, e.g., relative location within the image as indicated by a distribution, and generates multiple layers of parameters. Each parameter layer is input into another segmentation network for layer-wise feature manipulation. In some example embodiments, a network of neural networks in a single feed-forward pass receive a video sequence and track an object in the video sequence. In some example embodiments, the networks are differentiable and trainable using end-to-end using stochastic gradient descent. After training, the network can achieve a speed up of at least 70% faster over conventional approaches.

In some example embodiments, a visual guide modulator and a spatial guide modulator learn (e.g., via gradient descent training) to adjust the intermediate feature maps in a segmentation neural network based on an annotated first frame (e.g., image mask of the object to be tracked) and the spatial location of the object (e.g., a distribution depicting the likely location of the object). The visual guide modulator neural network takes an image mask as input, and produces channel-wise parameters for the convolution layers of a convolutional neural network configured to perform image segmentation. The spatial guide modulator neural network takes a location prior image as input, and produces location-wise parameters for each convolution layer in the convolutional neural network.

Channel-wise modulation can be implemented using conditional batch normalization. The scale and bias parameters of each batch-normalization layer is produced by another modulator network, and is used to control the behavior of the main network for tasks such as image stylization and question answering. In some example embodiments, layer-wise manipulation does not include batch normalization of layers, and instead implements stand-alone layers configured to perform scale-and-shift operations. Example stand-alone intermediate layers can be configured as, $$y_c = \gamma_c x_c + \beta_c \quad [1]$$

where $x_c$ and $y_c$ are the input and output feature maps in the c-th channel, and $\gamma_c$ and $\beta_c$ are the modulation parameters. In this way, the design of models with modulations can be more flexible. In some example embodiments, the scale and bias parameters are not used jointly, but rather operate independently of one another. The scale and bias parameters are controlled by different up-stream modulators and the model can be learned jointly with both modulators contributing values, according to some example embodiments.

Figure 9:
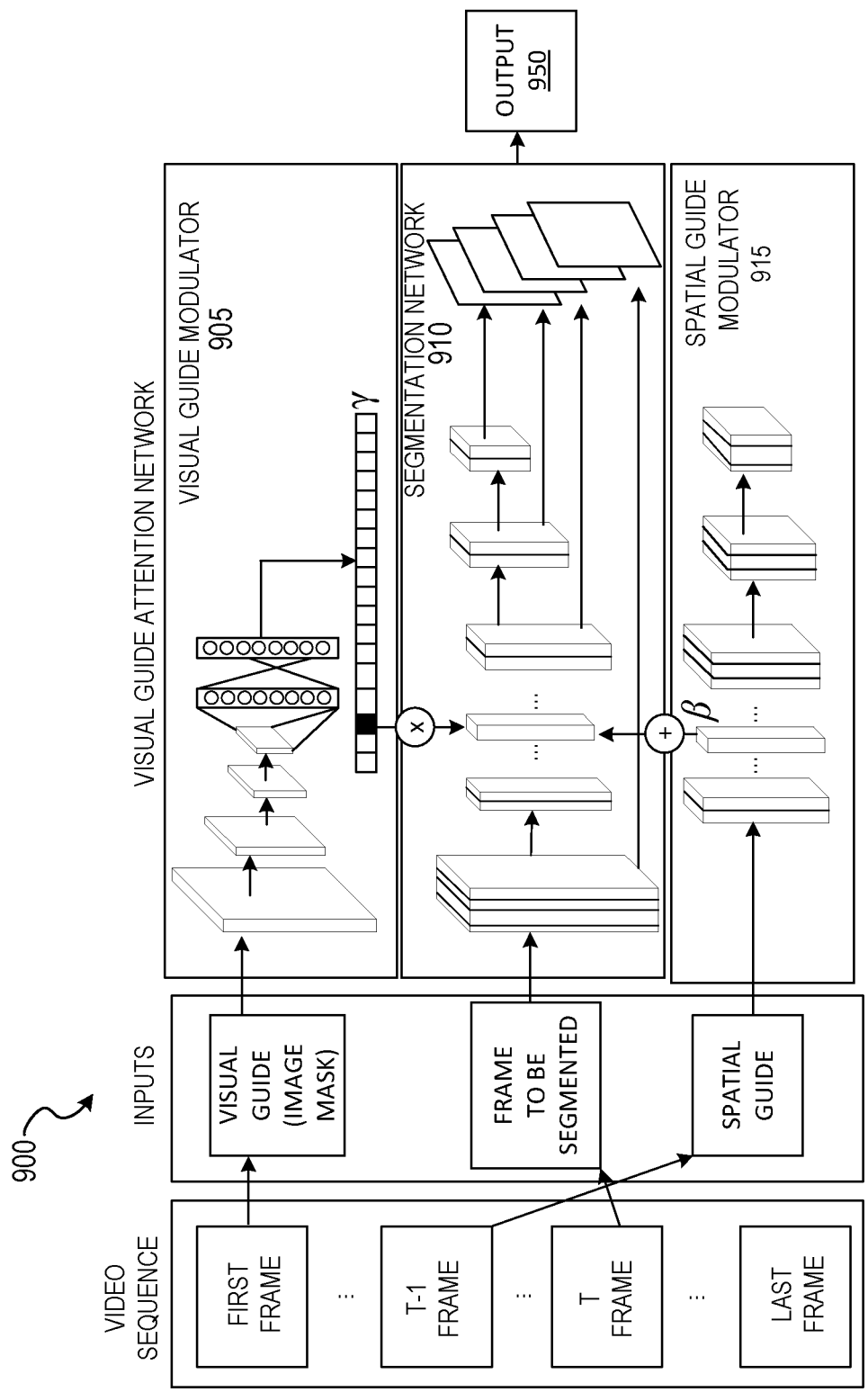
FIG. 9 shows an example architecture of a modulation segmentation system, according to some example embodiments.

In some example embodiments, a conditional scale-and-shift layer (e.g., modulated feature data) with parameters from both visual and spatial guide modulators is placed after each convolution layer in the segmentation neural network. The visual guide modulator network produces channel-wise parameters to adjust the weights of different channels in the feature map, while the spatial guide modulator produces element-wise bias parameters to inject location sensitive information to the modulated features. The conditional scale-and-shift layer can be formulated as, $$y_c = \gamma_c x_c + \beta_c \quad [2]$$

where $x_c$ and $y_c$ are the input and output feature map in the c-the channel, respectively; and where $\gamma_c$ and $\beta_c$ are modulation parameters from the visual and spatial guide modulators, respectively. $\gamma_c$ is a scaler, while $\beta_c$ is a two-dimensional vector to apply point-wise bias values. Further details are shown in FIG. 9, discussed below.

In some example embodiments, the visual guide modulator is used to adapt the segmentation network to focus on a specific object instance, which is the annotated object of the first frame in the scenario of one-shot video segmentation. The visual guide modulator extracts semantic information such as category, color, shape, texture from the annotated object and generates corresponding channel-wise weights so as to re-target the segmentation network to segment the object, potentially by focusing on the same category, color, shape, etc. In some example embodiments, a Visual Geometry Group 16 (VGG16) neural network is implemented as the model for visual guide modulator network. In some example embodiments, all the modulation parameters are produced in the last layer of the VGG16 model with fully-connected connections.

The visual guide modulator implicitly learns a multi-level representation of the various kinds of objects in the training data. In some example embodiments, the training data includes Microsoft Coco dataset, a large dataset having over 80 categories of object images. Since the visual guide modulator learns the mapping from an image to a vector that re-weights the features of different convolution layers in another network, and different convolution layers learn different levels of visual abstraction, the weights therefore embed the semantic information of the object on different abstraction levels. In this way, the visual guide modulator can "describe" in effect an arbitrary shape to be tracked through an image sequence, even if the arbitrary shape is unlike anything in the training image dataset. That is, by training the visual guide modulator to describe a large dataset, the trained visual guide modulator can describe characteristics (vector data) of the arbitrary shape to the segmentation network, such that the segmentation network can effectively track the arbitrary shape through an image sequence. Further, according to some example embodiments, the specific area of the arbitrary shape can effectively be "focused on" using attention data from the spatial guide modulator.

The spatial guide modulator gives a prior location of the object on the image, e.g., the location of the object in a previous frame on the basis that the object in the current frame is proximate to the prior location. In some example embodiments, the prior location is implemented as a two-dimensional Gaussian distribution on the image plane (e.g., a point spread function, PSF). The center and standard deviation of the Gaussian distribution is computed from the predicted mask of the previous frame. The Gaussian distribution is transformed into an image and is fed into the spatial guide modulator. The spatial guide modulator down-samples the image into different scales, in correspondence with the scales of different feature maps of the segmentation model, then it applies a scale-and-shift operation on each down-sampled Gaussian image to generate the bias parameters of the modulation layers. Mathematically the spatial guide modulator is configured as, $$\beta_c = \tilde{\gamma}_c m + \tilde{\beta}_c \quad [2]$$

where m is a down-sampled Gaussian image, and $\tilde{\gamma}_c$ and $\tilde{\beta}_c$ are the scale-and-shift parameters. The bias parameters focus the attention of a given layer of the segmentation network at the scale of the given layer of segmentation network.

FIG. 1 shows a block diagram of an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, and a social network system 122, in some example embodiments. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The application server 112 is communicatively coupled to a database server 118, which facilitates access to a database 120 in which is stored data associated with messages processed by the messaging server application 114.

Figure 2:
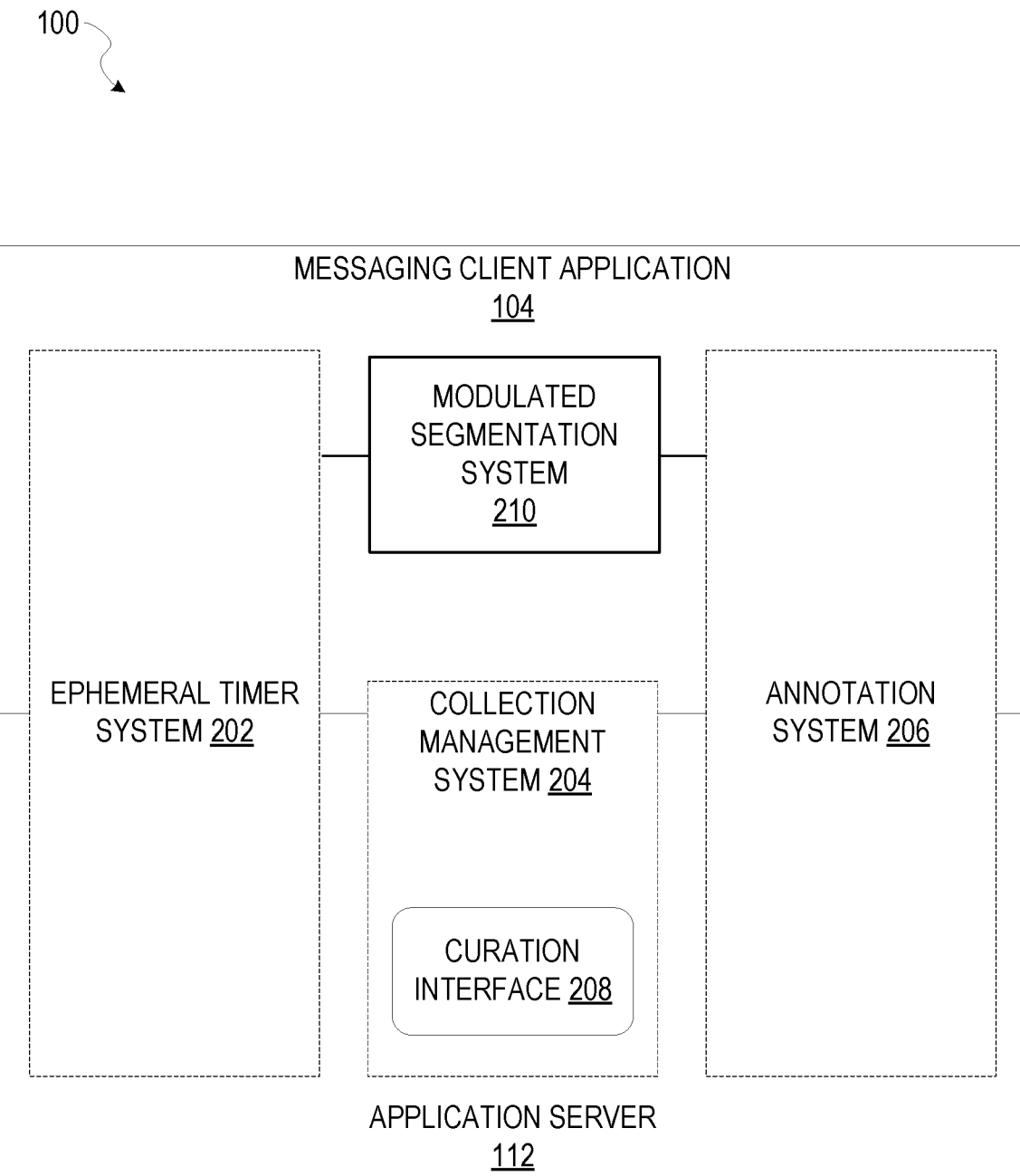
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and modulated segmentation system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a sequence of messages displayed as a live realtime slideshow or story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
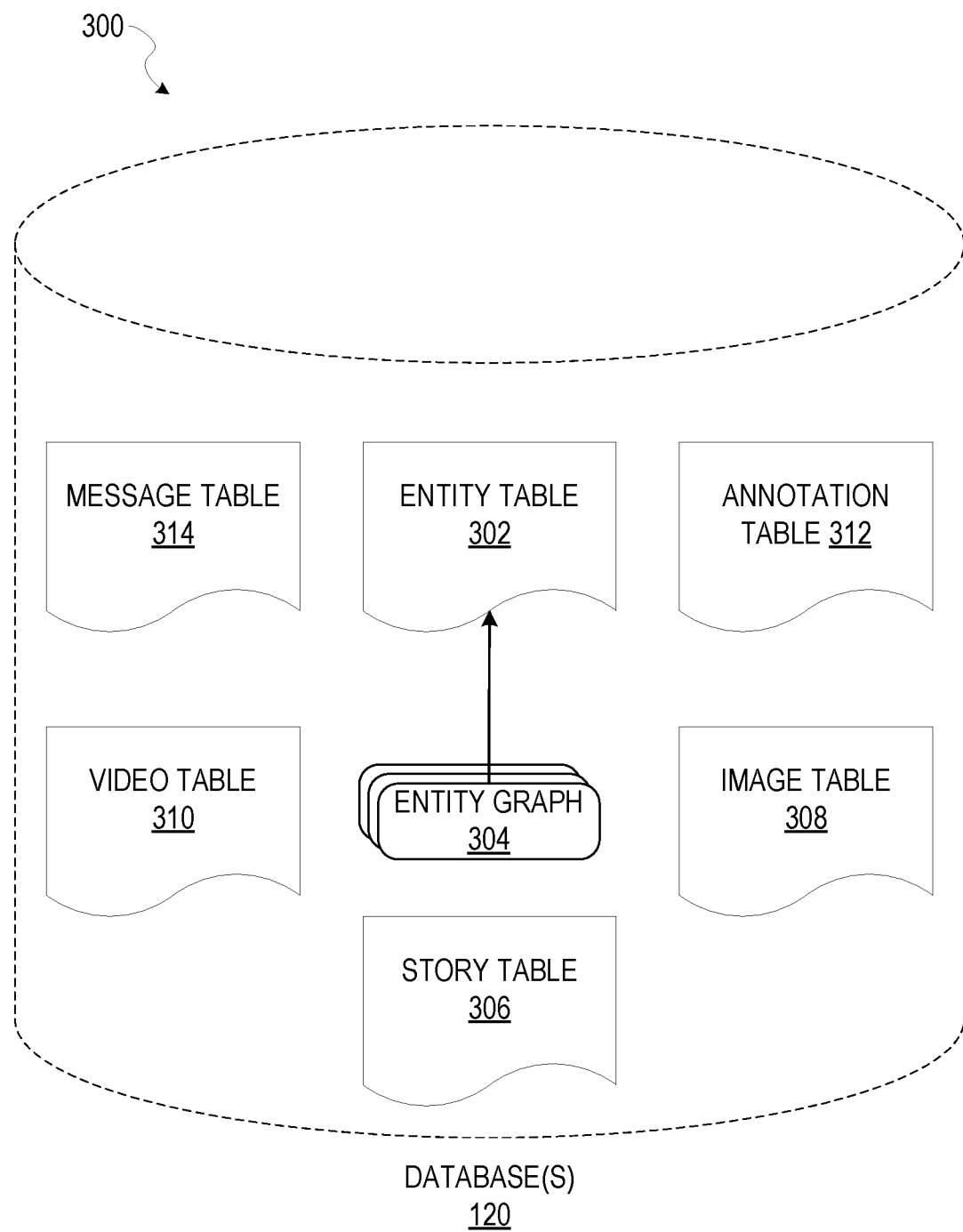
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
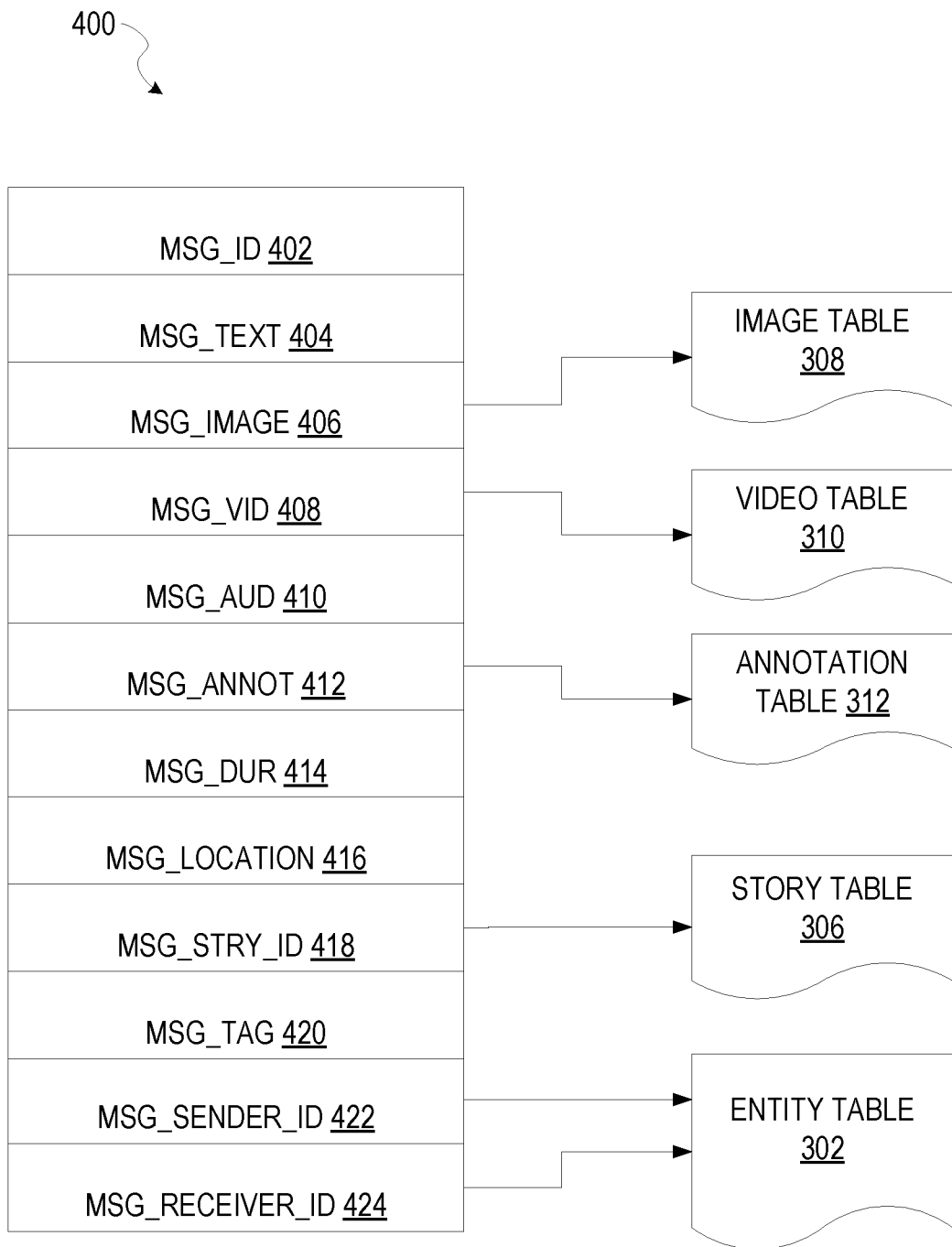
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data captured by a camera component of a client device 102 or retrieved from memory of a client device 102, and that is included in the message 400.
- A message video payload 408: video data captured by a camera component or retrieved from a memory component of the client device 102, and that is included in the message 400.
- A message audio payload 410: audio data captured by a microphone or retrieved from the memory component of the client device 102, and that is included in the message 400.
- Message annotations 412: annotation data (e.g., filters, stickers, or other enhancements) that represents annotations to be applied to the message image payload 406, message video payload 408, or message audio payload 410 of the message 400.
- A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.
- A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).
- A message story identifier 418: values identifying one or more content collections (e.g., "stories") with which a particular content item in the message image payload 406 of the message 400 is associated. For example, multiple images within the message image payload 406 may each be associated with multiple content collections using identifier values.
- A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent.
- A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
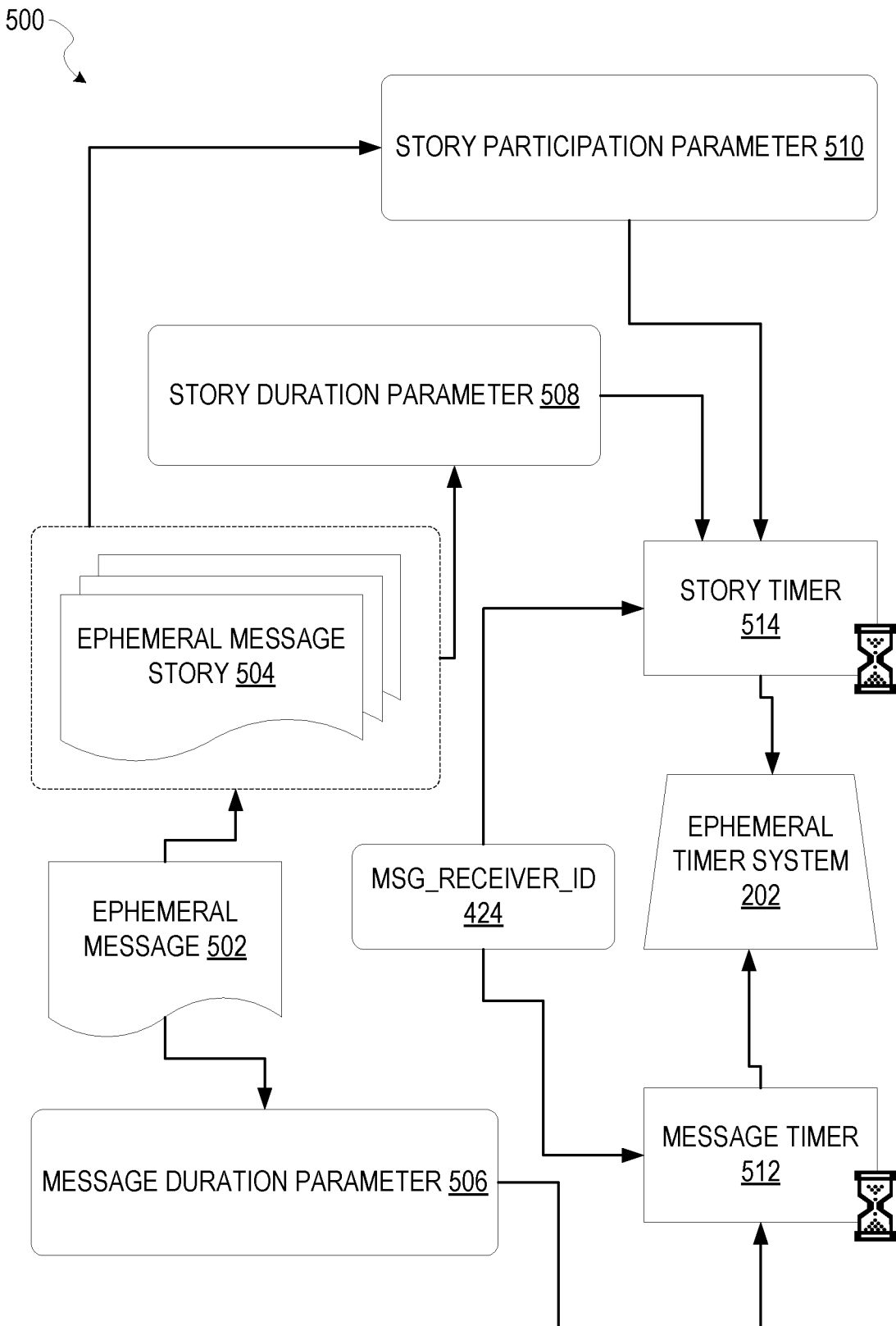
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral), according to some example embodiments.

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a social network site application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104.

Figure 6:
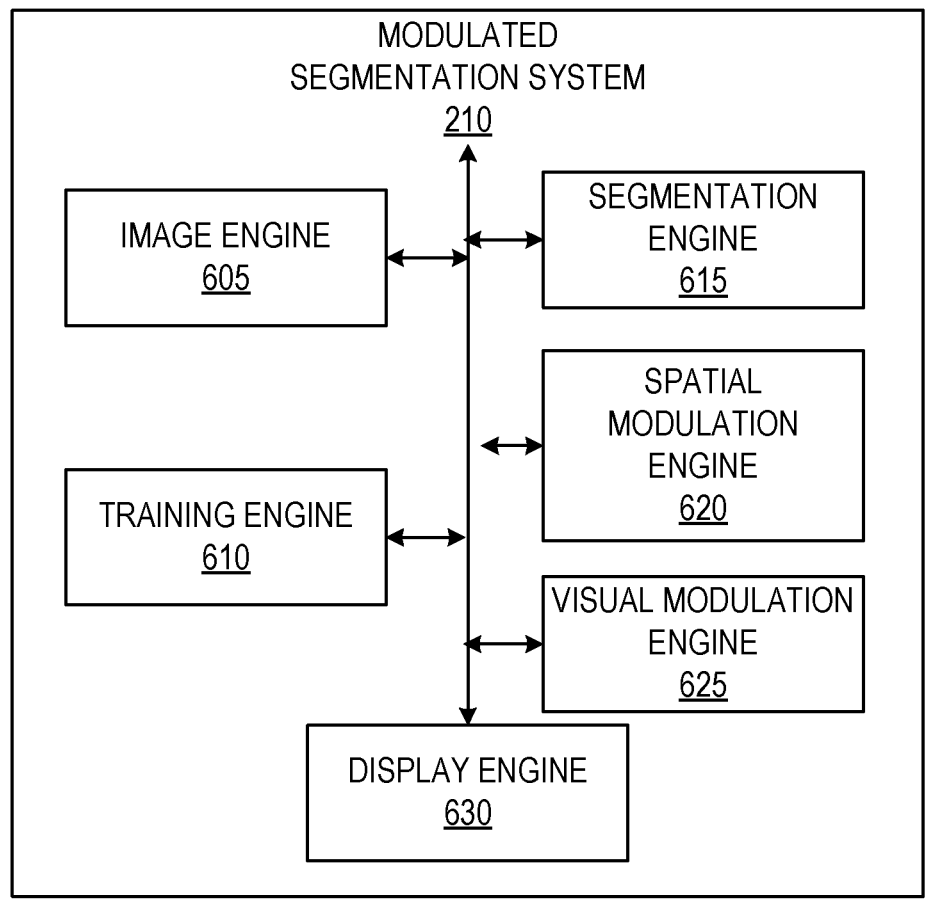
FIG. 6 shows example internal functional engines of a modulated segmentation system, according to some example embodiments.

FIG. 6 shows example internal functional engines of a modulated segmentation system, according to some example embodiments. As illustrated, the modulated segmentation system comprises an image engine 605, a training engine 610, a segmentation engine 615, a spatial modulation engine 620, a visual modulation engine 625, and a display engine 630. The image engine 605 is configured to generate one or more images (e.g., a video sequence) for processing using an image sensor of a user device. The training engine 610 is configured to train the neural networks (e.g., networks within segmentation engine 615, spatial modulation engine 620, and visual modulation engine 625) on training data in an end-to-end training process, as discussed with reference to FIG. 9 below. In some example embodiments, the modulated segmentation system 210 omits training engine 610. In those example embodiments, the training occurs off the user device (e.g., within a training engine on application server 112) and the trained model is distributed to modulated segmentation systems on different client devices.

The segmentation engine 615 is configured to implement a convolutional neural network to perform image segmentation. The spatial modulation engine 620 is configured to implement a neural network to generate layer parameter data for the layers in the segmentation engine 615. The visual modulation engine 625 is configured to implement a neural network to generate parameter data that describes an arbitrary shape to be tracked and segmented across images generated by the image engine 605. The display engine 630 is configured to use the image mask generated by the other engines and apply an image effect to the images to generate modified images. For example, the display engine 630 may comprise a style transfer neural network (e.g., CycleGAN) to transfer the style image from a first style to a second style. The display engine 630 can further be configured to publish the modified images an ephemeral message 502 or forward output data (e.g., mask data, segmentation, layer data, modified image data) to other components for processing as discussed above, according to some example embodiments.

Figure 7:
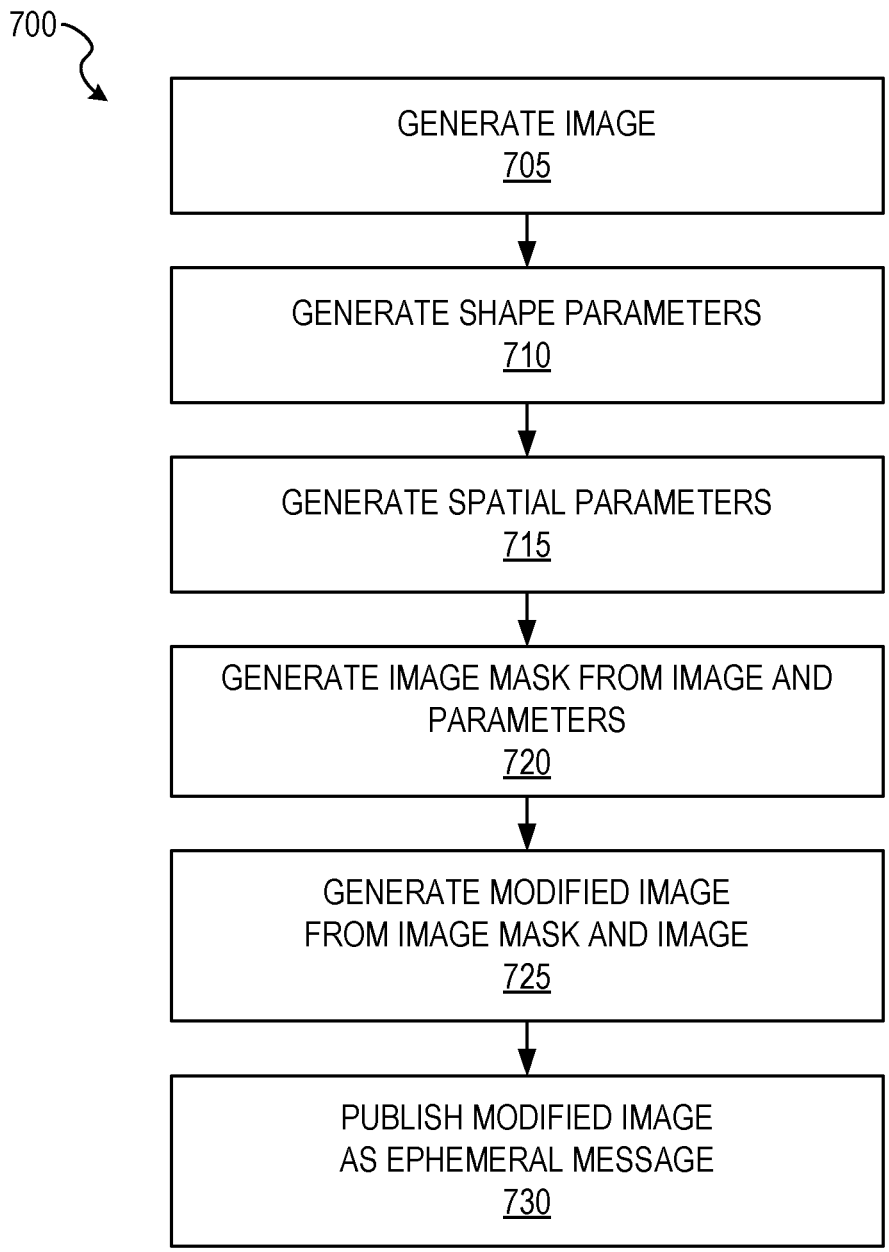
FIG. 7 shows an example flow diagram of a method for implementing modulated image segmentation, according to some example embodiments.

FIG. 7 shows an example flow diagram of a method 700 for implementing image segmentation using a network of neural nets, according to some example embodiments. Although the operations of method 700 are displayed as an sequence of operations, it is appreciated that multiple of the operations may be performed in parallel (e.g., operations 710, 715, and 720 may be performed in parallel and receive inputs from one another).

At operation 705, the image engine 605 generates one or more images using an image sensor of the client device. At operation 710, the visual modulation engine 625 generates shape parameters that describe a shape depicted in the image generated at operation 705. At operation 715, the spatial modulation engine 620 generates spatial parameters that emphasize the location of the object depicted in the image of operation 705. In some example embodiments, the spatial parameters may be generated using an image generated before the image of operation 705. At operation 720, the segmentation engine 615 generates an image mask for the object depicted in the image of operation 705. At operation 725, the display engine 630 modifies the image of 705 to generate a new image (e.g., a girl with a frown instead of a smile, as discussed below with reference to FIGS. 10-12). At operation 730, the display engine 630 publishes the modified image as an ephemeral message on a network site (e.g., website).

Figure 8:
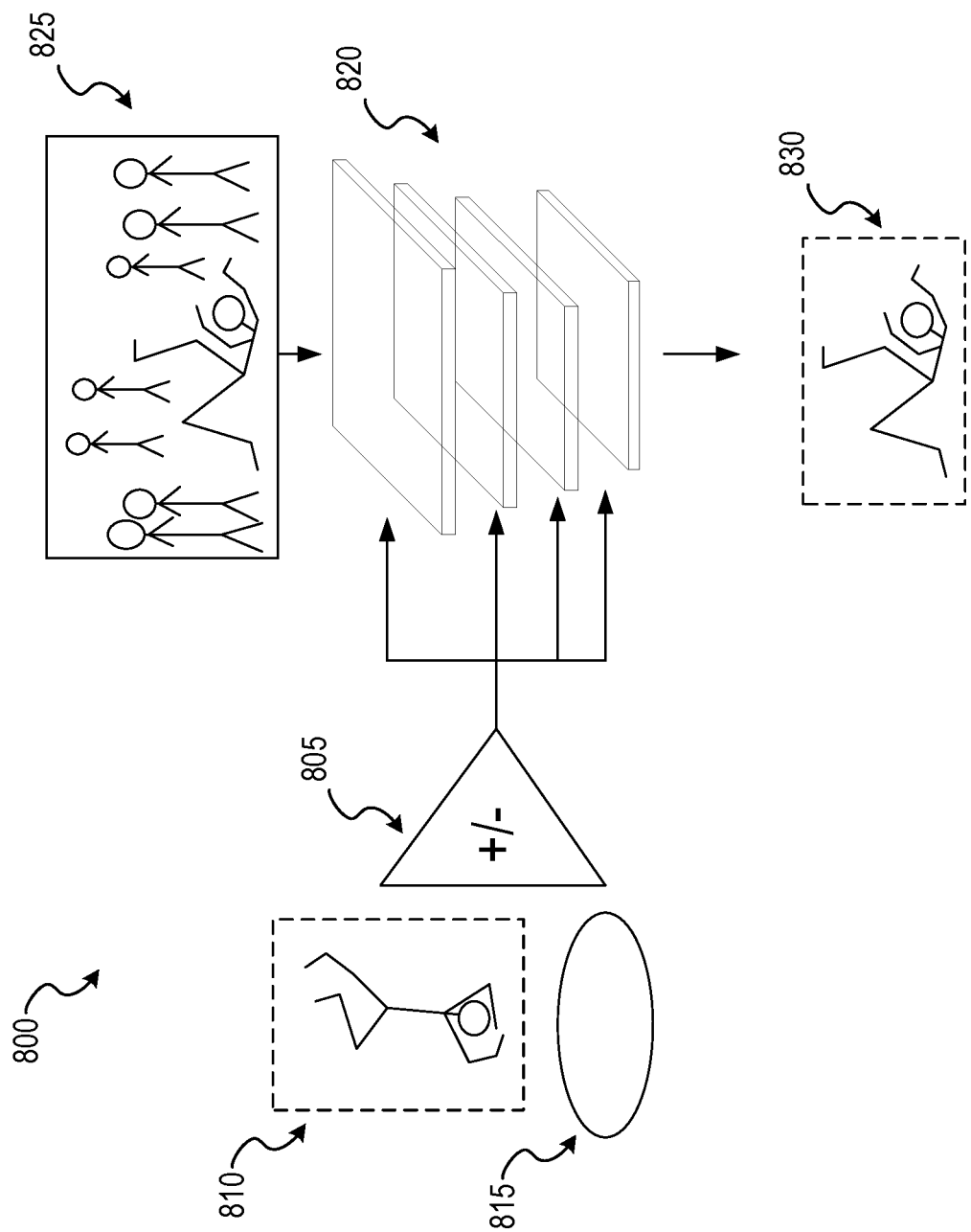
FIG. 8 shows an example data architecture of a modulator, according to some example embodiments.

FIG. 8 shows an example architecture 800 of a visual guide modulator, according to some example embodiments. In FIG. 8, a modulator 805 takes the object image 810 (e.g., a man doing a handstand while breakdancing) and object image spatial prior 815 (e.g., a Gaussian distribution, a point spread function) as inputs, and produces a list of layer-wise parameters. The layer wise parameters are input into a segmentation network 820 for layer-wise feature manipulation. The segmentation network 820 can receive an image 825 as input for segmentation processing. The image 825 may depict the same object or an object similar to the object depicted in object image 810. For example, object image 810 may depict a man doing a handstand while breakdancing and the image 825 may be a later image of the same video sequence that depicts the same man on the his back while breakdancing. The segmentation network 820 generates intermediate feature maps, which are adjusted layer wise by the layer-wise parameter inputs generated by the modulator 805. The output is an image mask 830 indicating the segment (e.g., image mask) of an object depicted in the image 825. The image mask 830 can then be used to track the object in the image 825 and/or apply an effect to the object even though the object in the image does not exactly match the object used for training (e.g., object image 810).

In this way, the segmentation network 820 can generate image masks for objects never before seen by the segmentation network 820.

FIG. 9 shows an example data architecture 900 of a modulation segmentation system 210, according to some example embodiments. In the example of FIG. 9, the modulation segmentation system 210 comprises three neural networks: a visual guide modulator 905, a segmentation network 910, and a spatial guide modulator 915. A video sequence serves as three kinds of inputs. First, the video sequence is used in the visual guide modulator 905 to generate layer parameters. The video sequence is further input into the segmentation network 910 for segmentation or image mask generation. Further, the video sequence provides spatial guide data for the object being tracked. For example, the spatial guide modulator 915 tracks the person dancing in the video sequence and uses a Gaussian object (e.g., point spread function) to focus more attention on the area of the image in which the dancer is currently located. As illustrated, the outputs of the visual guide modulator 905 and the spatial guide modulator 915 modify the intermediate feature representations of hidden layers in the segmentation network 910. The output 950 is an image mask of the object, e.g., an image mask of the breakdancer in the current frame ("T FRAME"), that can be produced even though the segmentation network 910 has never seen the specific object depicted in the video sequence (that is, the object in "T-FRAME" is a breakdancer in a new configuration, different from the dancer's configuration in the "FIRST FRAME").

Figure 10:
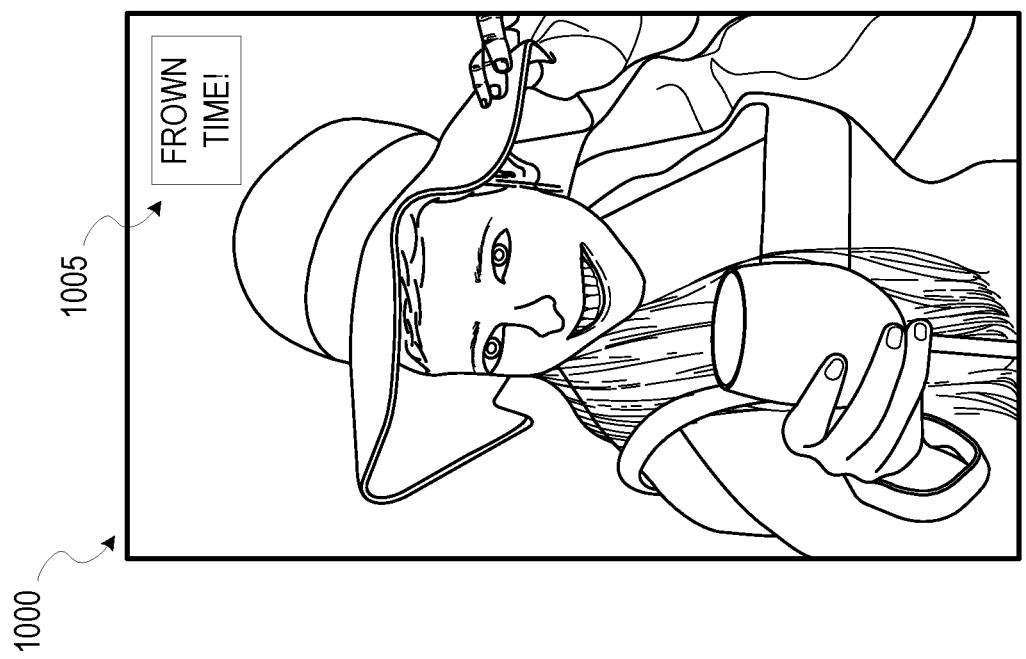
FIGS. 10-12 illustrate example user interfaces for implementing multistage neural network processing, according to some example embodiments.
Figure 11:
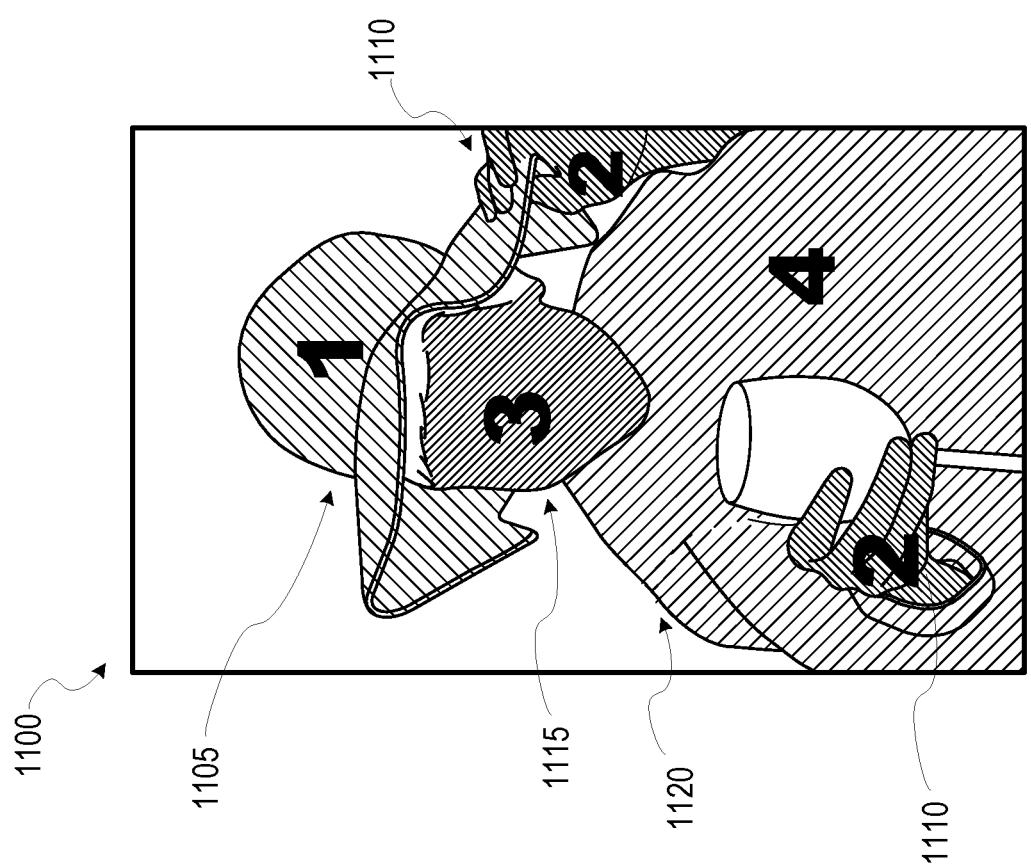
Figure 12:

FIGS. 10-12 illustrate example user interfaces for implementing modulated segmentation system 210, according to some example embodiments. As illustrated in FIG. 10, image 1000 is an example of an image captured at operation 705 of FIG. 7. The image 1000 depicts a smiling girl holding her hat and a tasty beverage. The image may be a current frame of a video sequence, where previous frames captured before the current frame were previously displayed on the client device. A user (e.g., the girl or another person holding a mobile phone taking a picture of the girl) may have selected button 1005 to initiate styling of the image 1000. An image mask may be required to perform the styling (e.g., the image mask is a mouth mask that labels pixels depicting the mouth area of the girl).

Responsive to selection of the button 1005 image segmentation is performed as discussed above (e.g., the first frame of the video sequence is used as a visual guide, the previous frame is used to generate a spatial guide, and both inputs are used to improve segmentation performed by a segmentation network). FIG. 11 shows a segmented image 1100, which has been derived by performing image segmentation on image 1000 of FIG. 10 using the modulated segmentation system 210. The segmented image 1100 denotes different areas of the image, including for example a hat area 1105 (labeled "1"), skin areas that are not part of the face 1110 (labeled "2"), a face area 1115 (labeled "3"), and a clothes area 1120 (labeled "4"). The different label values may be included as channel data for each pixel (e.g., a forth channel in addition to RGB (Red/Blue/Green) channels). Further, the label values may be stored as a separate image having the same height and width as image 1000. In some example embodiments, only a single area of the image needs to be tracked, and the sys 210 segments one area. For example, if only the face area needs to be tracked to apply a face based visual effect, then only the face area 1115 may be segmented or otherwise included as an image mask.

FIG. 12 shows an example modified image 1200 which has undergone style transfer from a smile style to a frown style using an image mask (e.g., an eye area image mask, a mouth area image mask). In some example embodiments, a style transfer neural network is initiated to perform style transfer using a set of training data of people frowning and smiling, as is understood by one of ordinary skill in the art. After the modified image is generated, it can be published via the display engine 625 as an ephemeral message 502.

Figure 13:
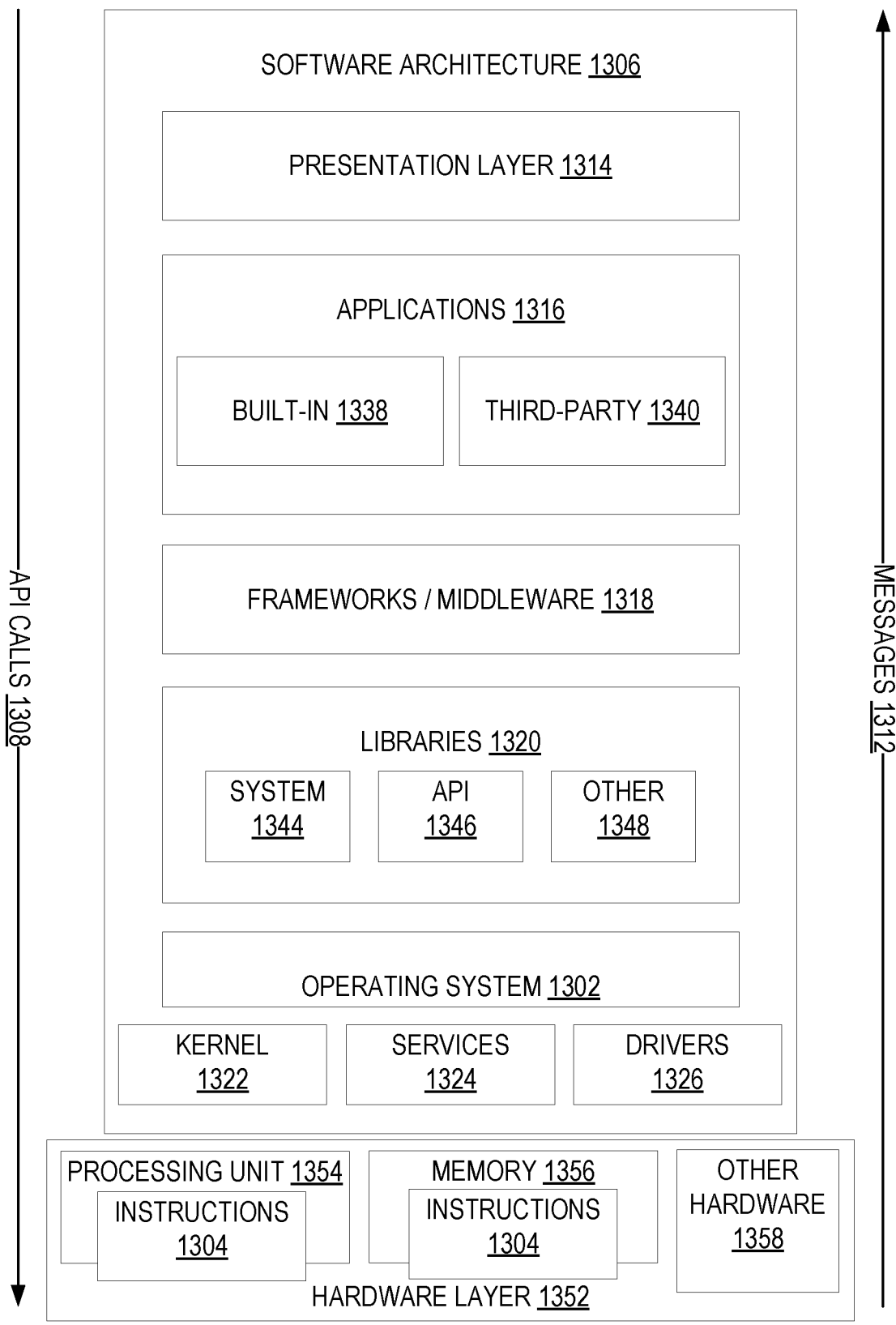
FIG. 13 is a block diagram illustrating a representative software architecture, which may be used in conjunction with various hardware architectures herein described.

FIG. 13 is a block diagram illustrating an example software architecture 1306, which may be used in conjunction with various hardware architectures herein described. FIG. 13 is a non-limiting example of a software architecture, and it will be appreciated that many other architectures may be implemented to facilitate the functionality described herein. The software architecture 1306 may execute on hardware such as a machine 1300 of FIG. 13 that includes, among other things, processors, memory, and I/O components. A representative hardware layer 1352 is illustrated and can represent, for example, the machine 1300 of FIG. 13. The representative hardware layer 1352 includes a processing unit 1354 having associated executable instructions 1304. The executable instructions 1304 represent the executable instructions of the software architecture 1306, including implementation of the methods, components, and so forth described herein. The hardware layer 1352 also includes a memory/storage 1356, which also has the executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1316, and a presentation layer 1314. Operationally, the applications 1316 and/or other components within the layers may invoke API calls 1308 through the software stack and receive a response in the form of messages 131bb2. The layers illustrated are representative in nature and not all software architectures have all layers. For example, some mobile or special-purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than by interfacing directly with the underlying operating system 1302 functionality (e.g., kernel 1322, services 1324, and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. The third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as the operating system 1302) to facilitate functionality described herein.

The applications 1316 may use built-in operating system functions (e.g., kernel 1322, services 1324, and/or drivers 1326), libraries 1320, and frameworks/middleware 1318 to create user interfaces to interact with users of the system. Alternatively, or additionally, in some systems, interactions with a user may occur through a presentation layer, such as the presentation layer 1314. In these systems, the application/component "logic" can be separated from the aspects of the application/component that interact with a user.

Figure 14:
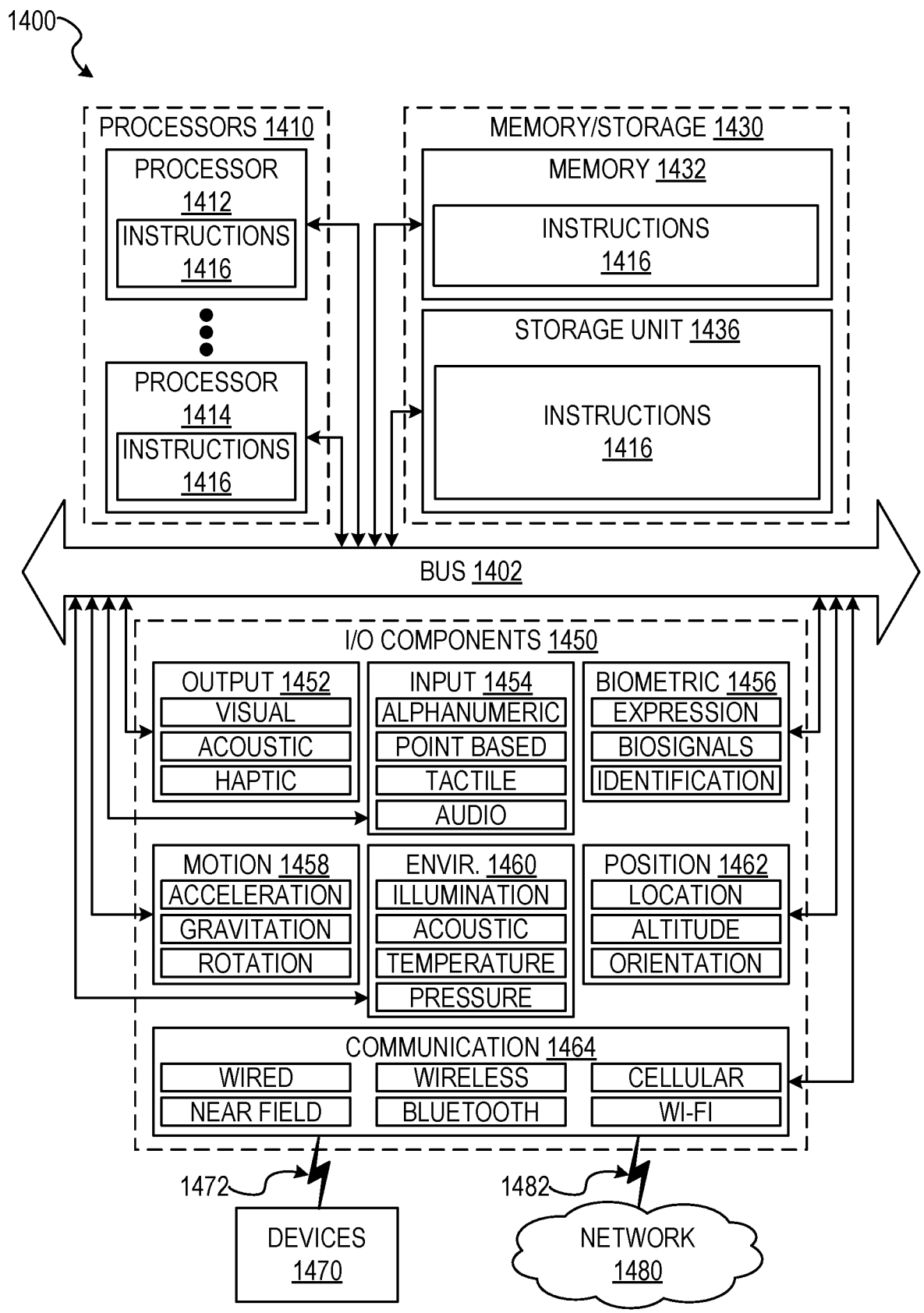
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. As such, the instructions 1416 may be used to implement modules or components described herein. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor cache memory accessible to processors 1412 or 1414), or any suitable combination thereof, during execution thereof by the machine 1400. Accordingly, the memory 1432, the storage unit 1436, and the memory of the processors 1410 are examples of machine-readable media.

The I/O components 1450 may include a wide variety of components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environment components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environment components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or other suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1416 for execution by the machine 1400, and includes digital or analog communications signals or other intangible media to facilitate communication of such instructions 1416. Instructions 1416 may be transmitted or received over the network 1480 using a transmission medium via a network interface device and using any one of a number of well-known transfer protocols.

"CLIENT DEVICE" in this context refers to any machine 1400 that interfaces to a network 1480 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1480.

"COMMUNICATIONS NETWORK" in this context refers to one or more portions of a network 1480 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1480 may include a wireless or cellular network and the coupling 1482 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1416 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions 1416 (e.g., code) for execution by a machine 1400, such that the instructions 1416, when executed by one or more processors 1410 of the machine 1400, cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1412 or a group of processors 1410) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1400) uniquely tailored to perform the configured functions and are no longer general-purpose processors 1410. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1412 configured by software to become a special-purpose processor, the general-purpose processor 1412 may be configured as respectively different special-purpose processors (e.g., comprising different hardware components) at different times. Software accordingly configures a particular processor 1412 or processors 1410, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1410 that are temporarily configured (e.g., by software) or permanently configured to perform the relevant operations. Whether temporarily or permanently configured, such processors 1410 may constitute processor-implemented components that operate to perform one or more operations or functions described herein. As used herein, "processor-implemented component" refers to a hardware component implemented using one or more processors 1410. Similarly, the methods described herein may be at least partially processor-implemented, with a particular processor 1412 or processors 1410 being an example of hardware. For example, at least some of the operations of a method may be performed by one or more processors 1410 or processor-implemented components. Moreover, the one or more processors 1410 may also operate to support performance of the relevant operations in a "cloud computing" environment or as a "software as a service" (SaaS). For example, at least some of the operations may be performed by a group of computers (as examples of machines 1400 including processors 1410), with these operations being accessible via a network 1480 (e.g., the Internet) and via one or more appropriate interfaces (e.g., an API). The performance of certain of the operations may be distributed among the processors 1410, not only residing within a single machine 1400, but deployed across a number of machines 1400. In some example embodiments, the processors 1410 or processor-implemented components may be located in a single geographic location (e.g., within a home environment, an office environment, or a server farm). In other example embodiments, the processors 1410 or processor-implemented components may be distributed across a number of geographic locations.

"PROCESSOR" in this context refers to any circuit or virtual circuit (a physical circuit emulated by logic executing on an actual processor 1412) that manipulates data values according to control signals (e.g., "commands," "op codes," "machine code," etc.) and which produces corresponding output signals that are applied to operate a machine 1400. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1410 may further be a multi-core processor 1410 having two or more independent processors 1412, 1414 (sometimes referred to as "cores") that may execute instructions 1416 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
generating, by one or more processors of a user device, an image depicting an object;
generating multiple layer parameters using a first neural network, each layer parameter configured to modify intermediate feature data of a second neural network by:
generating shape parameters that describe a shape of the object;
generating, using a previous image that is generated prior to the image, spatial parameters that emphasize a location of the object depicted in the image;
generating image mask data for the object depicted in the image using the second neural network, the second neural network comprising a plurality of intermediate layers configured to generate modulated feature data using the shape parameters and the spatial parameters generated by the first neural network; and
storing the image mask data on the user device.

2. The method of claim 1, further comprising:
generating a modified image using the image and the image mask data; and
publishing the modified image as an ephemeral message on a network site.

3. The method of claim 1, further comprising:
training the first neural network and second neural network on training data using gradient descent.

4. The method of claim 3, wherein the second neural network is trained on training data that does not include the object depicted in the image, and wherein the first neural network and the second neural network are trained using end-to-end training.

5. The method of claim 3, wherein the training data comprises images of different objects.

6. The method of claim 5, wherein the image mask data indicates pixel locations of one of the different objects.

7. The method of claim 6, wherein the object depicted in the image is not included in the training data.

8. The method of claim 1, wherein the first neural network generates multiple sets of layer parameters using, as inputs, a shape object and a spatial prior of the shape object.

9. The method of claim 8, wherein the shape object has a different shape than a shape used to generate the image mask data.

10. The method of claim 8, wherein the spatial prior is a Gaussian distribution.

11. A system comprising:
one or more processors of a machine; and
a memory storing instructions that, when executed by the one or more processors, cause the machine to perform operations comprising:
generating, by one or more processors of a user device, an image depicting an object;
generating multiple layer parameters using a first neural network, each layer parameter configured to modify intermediate feature data of a second neural network by:
generating shape parameters that describe a shape of the object;
generating, using a previous image that is generated prior to the image, spatial parameters that emphasize a location of the object depicted in the image;
generating image mask data for the object depicted in the image using the second neural network, the second neural network comprising a plurality of intermediate layers configured to generate modulated feature data using the shape parameters and the spatial parameters generated by the first neural network; and
storing the image mask data on the user device.

12. The system of claim 11, the operations further comprising:
generating a modified image using the image and the image mask data; and
publishing the modified image as an ephemeral message on a network site.

13. The system of claim 11, the operations further comprising:
training the first neural network and second neural network on training data using gradient descent.

14. The system of claim 13, wherein the second neural network is trained on training data that does not include the object depicted in the image, and wherein the first neural network and the second neural network are trained using end-to-end training.

15. The system of claim 13, wherein the training data comprises images of different objects.

16. The system of claim 15, wherein the image mask data indicates pixel locations of one of the different objects.

17. The system of claim 16, wherein the object depicted in the image is not included in the training data.

18. The system of claim 11, wherein the first neural network generates multiple sets of layer parameters using, as inputs, a shape object and a spatial prior of the shape object.

19. A machine-readable storage device embodying instructions that, when executed by a machine, cause the machine to perform operations comprising:
generating, by one or more processors of a user device, an image depicting an object;
generating multiple layer parameters using a first neural network, each layer parameter configured to modify intermediate feature data of a second neural network by:

generating shape parameters that describe a shape of the object;

generating, using a previous image that is generated prior to the image, spatial parameters that emphasize a location of the object depicted in the image;

generating image mask data for the object depicted in the image using the second neural network, the second neural network comprising a plurality of intermediate layers configured to generate modulated feature data using the shape parameters and the spatial parameters generated by the first neural network; and storing the image mask data on the user device.

20. The machine-readable storage device of claim 19, the operations further comprising:

generating a modified image using the image and the image mask data; and publishing the modified image as an ephemeral message on a network site.

* * * * *